W. WOODALL.
PLANT LIFTING ATTACHMENT FOR CULTIVATORS.
APPLICATION FILED MAY 8, 1914.
1,122,184. Patented Dec. 22, 1914.
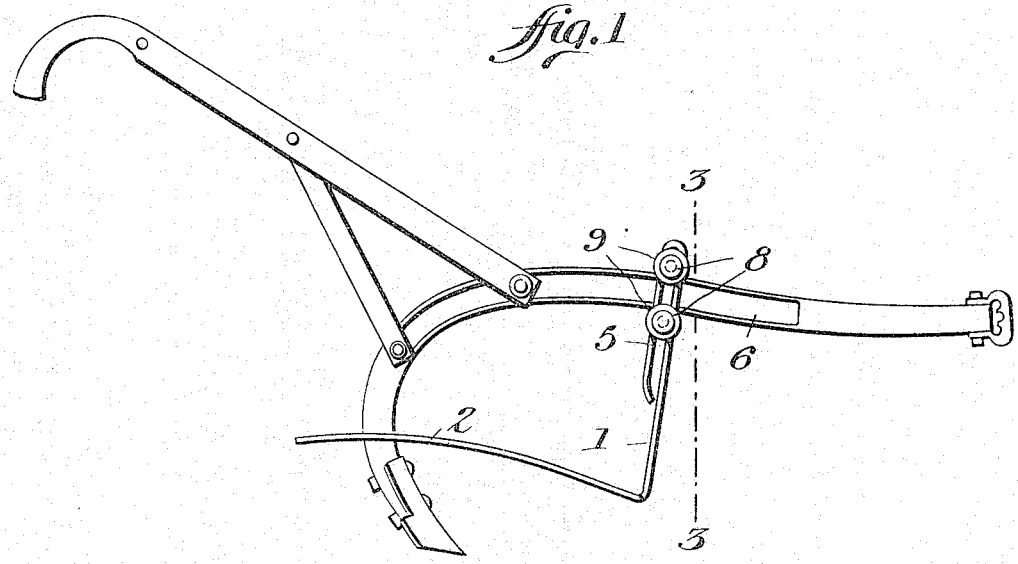
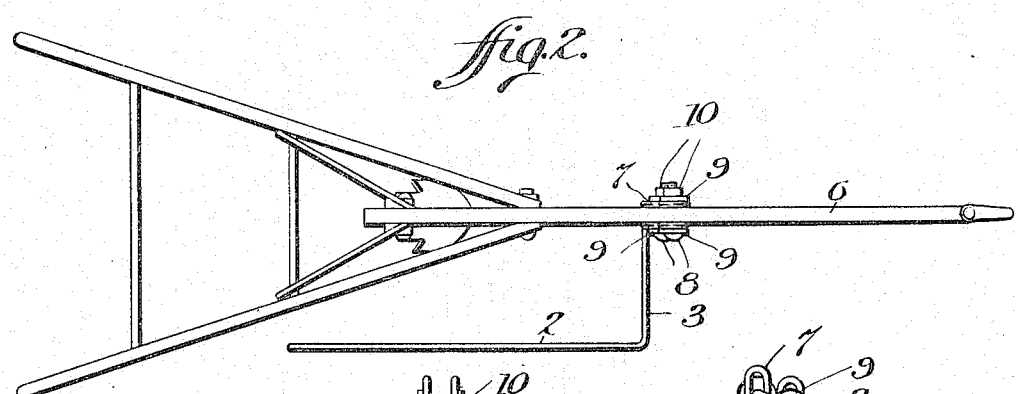
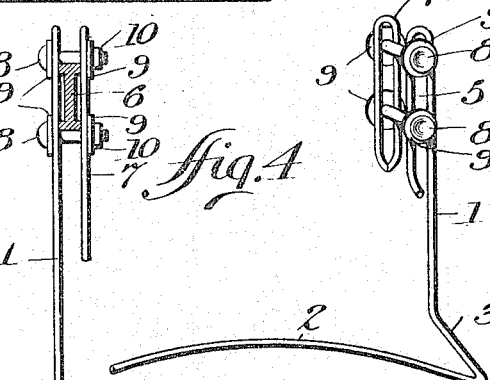
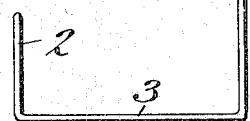
Walter Woodall
By Victor J. Evans
Attorney

UNITED STATES PATENT OFFICE.

WALTER WOODALL, OF BENSON, NORTH CAROLINA.

PLANT-LIFTING ATTACHMENT FOR CULTIVATORS.

1,122,184.   Specification of Letters Patent.   Patented Dec. 22, 1914.

Application filed May 8, 1914. Serial No. 837,283.

*To all whom it may concern:*

Be it known that I, WALTER WOODALL, a citizen of the United States, residing at Benson, in the county of Johnston and State of North Carolina, have invented new and useful Improvements in Plant-Lifting Attachments for Cultivators, of which the following is a specification.

This invention relates to a plant lifting attachment for cultivating plows, employed in the cultivation of tobacco, cabbages, peanuts, and like plants, the object of the invention being to provide a simple and efficient device for elevating the leaves of the plants from the ground during the passage of the plow, allowing the plants to be hilled without the leaves becoming covered with earth.

A further object of the invention is to provide a device of the character described which may be inexpensively manufactured and sold, which may be adapted for attachment to the right or left hand side of the plow as desired, which may be easily and conveniently applied and removed, and which will be found of value in preventing the destruction of the leaves of the plants which lie in contact with the ground by lifting them and freeing them from the particles of earth, etc.

The invention consists of the features of construction, combination and arrangement of parts herein fully described and claimed, reference being had to the accompanying drawing in which:—

Figure 1 is a side elevation showing the application of the invention to a cultivator plow. Fig. 2 is a top plan view of the same. Fig. 3 is a vertical transverse section on the line 3—3 of Fig. 1. Fig. 4 is a perspective view of the device detached from the plow beam.

The device is preferably formed of a length of stout spring wire, said wire being bent to form a shank or standard 1, a lifting arm 2, and a connecting portion or member 3.

The end of the wire of which the standard 1 forms a part is bent back parallel with the standard so as to provide a longitudinally slotted attaching portion 5. A connecting member 3 projects laterally at right angles from the lower end of the standard 1, while the arm 2 projects rearwardly from the outer end of the said connecting member 3, said arm 2 being longitudinally curved, as shown.

The slotted attaching member 5 is disposed upon one side of the plow beam 6, at the opposite side of which is placed another slotted attaching member 7, between which attaching members extend headed bolts 8 provided with washers 9 and clamping nuts 10, whereby the device is adapted to be firmly clamped to the beam and may be adjusted vertically upon the beam and set to operate at a desired working angle.

As illustrated, the shank is arranged in practice to extend downwardly and rearwardly at an oblique angle to the beam, thus disposing the connecting member 3 at a suitable elevation above the surface of the ground, while the lifting arm 2 extends downwardly and rearwardly so as to lie in an inclined plane, its forward end terminating at a point close to the ground.

In operation, the plow, with the attachment, is driven along and between adjacent rows of plants, and the connecting member 3 disposes the lifting arm 2 so as to run close to the stems of the plants of one of the rows so as to come under the leaves of the plants at the adjacent side thereof. As the plow passes along, the arm extends under the depressed leaves and lifts the same, the leaves riding upwardly and rearwardly over the arm and connecting member 3, while the earth is being thrown toward the plants by the plowshare. By this means the depressed leaves are elevated and relieved of earth and other foreign matter weighing them down, and are also so disposed as to allow the earth from the share to be thrown toward the plants for hilling action, without the earth coming in contact with the leaves. The device will be found of advantage in cultivating tobacco, peanuts, cabbage and other plants having leaves lying in contact with the ground and beaten down by storms or held depressed by the weight of earth thereon, the device raising the leaves clear of the ground, while at the same time allowing the plants to be hilled without injury. It will be evident that the angle of inclination of the device may be varied, as well as its elevation with relation to the ground, and that the device may be constructed for application to either the right or left hand side of the beam.

I claim:—

1. The combination with a plow beam, of fastening means applied to the beam, a shank secured to the beam by said fastening means and projecting downwardly and rearwardly at an angle to the beam, a member projecting outwardly and laterally from the shank at right angles to the beam, and a longitudinally curved lifting arm connected at its forward end to said member and extending rearwardly therefrom, said arm being disposed on a general upwardly and rearwardly curved plane.

2. The combination with a plow beam, of slotted attaching members disposed on opposite sides thereof, bolts passing through said slotted fastening members above and below the beam, a shank depending from one of said fastening members at a downward and rearward angle to the beam, a member projecting outwardly and laterally at right angles from the lower end of the shank, and a longitudinally curved lifting arm connected at its forward end with the outer end of said member and projecting rearwardly and parallel with the beam, said lifting arm having its forward end disposed at its lowest point and thence extending on an upward and rearward line of curvature.

3. The combination with a plow beam, of a leaf elevating device comprising a shank attached to the beam and extending at a downward and rearward angle therefrom, a member extending laterally from the lower end of the shank, and a longitudinally curved lifting arm projecting rearwardly at a downward angle from said member in a plane parallel with the plane of the beam.

In testimony whereof I affix my signature in presence of two witnesses.

WALTER WOODALL.

Witnesses:
O. A. BARBOUR,
J. A. PARKS.

Copies of this patent may be obtained for five cents each, by addressing the "Commissioner of Patents, Washington, D. C."